United States Patent
Pitzer et al.

(10) Patent No.: US 11,851,220 B2
(45) Date of Patent: Dec. 26, 2023

(54) SYSTEM AND METHOD FOR FILLING A CONTAINER WITH FRAGILE FRUIT

(71) Applicant: Harvest CROO, LLC, Plant City, FL (US)

(72) Inventors: Robert Henry Pitzer, Tampa, FL (US); Mark Morrow, Camden, SC (US); Paul Miller, Cheraw, SC (US); Timothy Vernarsky, Hartsville, SC (US)

(73) Assignee: HARVEST CROO, LLC, Plant City, FL (US)

( * ) Notice: Subject to any disclaimer, the term of this patent is extended or adjusted under 35 U.S.C. 154(b) by 60 days.

(21) Appl. No.: 17/547,642

(22) Filed: Dec. 10, 2021

(65) Prior Publication Data

US 2022/0097881 A1    Mar. 31, 2022

Related U.S. Application Data

(63) Continuation of application No. 16/803,607, filed on Feb. 27, 2020, now Pat. No. 11,198,529.

(60) Provisional application No. 62/827,466, filed on Apr. 1, 2019.

(51) Int. Cl.
*B65B 25/04* (2006.01)
*B65B 35/24* (2006.01)
*B65B 1/32* (2006.01)
*B65B 1/22* (2006.01)

(52) U.S. Cl.
CPC ............. *B65B 25/045* (2013.01); *B65B 1/22* (2013.01); *B65B 1/32* (2013.01); *B65B 25/046* (2013.01); *B65B 35/24* (2013.01)

(58) Field of Classification Search
CPC .... B65B 1/04; B65B 1/06; B65B 1/08; B65B 1/22; B65B 1/30; B65B 1/32; B65B 1/34; B65B 1/46; B65B 5/068; B65B 25/04; B65B 25/045; B65B 25/046; B65B 35/24; B65B 43/40
USPC ........................................... 53/235, 245, 502
See application file for complete search history.

(56) References Cited

U.S. PATENT DOCUMENTS

| | | | |
|---|---|---|---|
| 1,950,961 A * | 3/1934 | Allen | B65B 25/046 53/145 |
| 1,974,192 A * | 9/1934 | Paxton | B65B 25/046 493/453 |
| 2,626,042 A | 1/1953 | Aldridge | |
| 2,647,670 A | 8/1953 | Cox | |
| 3,099,115 A | 7/1963 | Mckibben et al. | |
| 3,344,579 A | 10/1967 | Gentry et al. | |
| 3,447,337 A | 6/1969 | Skruch et al. | |
| 3,470,670 A | 10/1969 | Gorin | |

(Continued)

FOREIGN PATENT DOCUMENTS

| | | | | |
|---|---|---|---|---|
| EP | 0358847 | | 3/1990 | |
| GB | 2290517 A | * | 1/1996 | ........... B65B 25/045 |
| KR | 101488221 B1 | * | 2/2015 | ........... B65B 25/045 |

*Primary Examiner* — Stephen F. Gerrity

(74) *Attorney, Agent, or Firm* — BRYAN CAVE LEIGHTON PAISNER LLP

(57) ABSTRACT

A method including transporting fragile fruit into a hopper. The method also includes transferring the fragile fruit from the hopper into a container that is at least partially submerged in a fluid. The method additionally includes raising the container out of the fluid while the fragile fruit are within the container. Other embodiments are described.

20 Claims, 8 Drawing Sheets

(56) References Cited

U.S. PATENT DOCUMENTS

| | | | |
|---|---|---|---|
| 3,550,347 | A | 12/1970 | Coates |
| 3,565,250 | A | 2/1971 | Borba et al. |
| 3,587,674 | A | 6/1971 | Adkin |
| 3,643,400 | A | 2/1972 | Barbet |
| 3,656,272 | A | 4/1972 | Sheetz |
| 3,694,996 | A | 10/1972 | Carlsen |
| 3,696,584 | A | 10/1972 | Rickard |
| 3,949,861 | A | 4/1976 | Scholtens et al. |
| 4,051,645 | A | 10/1977 | Warkentin |
| 4,693,285 | A | 9/1987 | Chang |
| 4,807,422 | A | 2/1989 | Blanc |
| 5,113,881 | A * | 5/1992 | Lin et al. ............... A23N 12/02 134/1 |
| 5,242,250 | A | 9/1993 | Compagoni |
| 6,012,270 | A | 1/2000 | Vine |
| 6,871,654 | B1 * | 3/2005 | Berke et al. ............ A47J 43/24 134/1 |
| 7,159,373 | B2 | 1/2007 | Blanc |
| 7,472,799 | B2 | 1/2009 | Cadiente et al. |
| 10,138,011 | B2 | 11/2018 | Ruissen et al. |
| 2004/0159527 | A1 * | 8/2004 | Williamson .......... B65B 25/046 198/459.1 |
| 2006/0092756 | A1 | 5/2006 | Indbeck et al. |
| 2008/0066429 | A1 | 3/2008 | De Greef |
| 2015/0307257 | A1 | 10/2015 | Padda et al. |
| 2015/0353212 | A1 | 12/2015 | Williamson |
| 2018/0162571 | A1 | 6/2018 | Nijland et al. |

\* cited by examiner

*(Wet Fill)*

*(Dry Fill)*

SYSTEM AND METHOD FOR FILLING A CONTAINER WITH FRAGILE FRUIT

CROSS-REFERENCE TO RELATED APPLICATIONS

This application is a continuation of U.S. patent application Ser. No. 16/803,607, filed Feb. 27, 2020, which claims the benefit of U.S. Provisional Application No. 62/827,466, filed Apr. 1, 2019. U.S. patent application Ser. No. 16/803,607 and U.S. Provisional Application No. 62/827,466 are incorporated herein by reference in their entirety.

TECHNICAL FIELD

This disclosure relates to an apparatus and method for filling a container with fragile fruit. More particularly, this disclosure relates to an apparatus and method for filling a container with fragile fruit using a container submerged in water.

BACKGROUND

Strawberries are currently picked and packed manually. Strawberries are fragile in terms of bruising and their shelf life is very short (10 days or so). Labor to harvest the strawberries is getting scarce, not to mention expensive. Large strawberry farms are looking to modern technology to solve this problem, including robotic automation for picking fruit. While there are current techniques to robotically pick strawberries, there does not yet exist technology to package the berries in a suitably gentle manner that also achieves desired speed, weight and cost requirements.

The present disclosure is designed to solve the problems described above.

BRIEF SUMMARY OF THE INVENTION

The present disclosure generally relates to an apparatus and method for filling a container with fragile fruit involving submerging the container in water to better distribute the fragile fruit within the container. The container may be filled with fragile fruit either before or after being submerged in water. The fragile fruit may be transported using a stream of water or other suitable fluid medium.

In one aspect a "wet fill" apparatus is provided that comprises a dip tank affixed to a frame and configured to hold a fluid, a movable platform mounted above the dip tank for receiving a container, a transport chute positioned near the frame and configured to accommodate a stream of water to transport the fragile fruit to a hopper, the hopper operably connected to a load cell for measuring the weight of the fragile fruit in the hopper, means for transporting the fragile fruit from the hopper to the container, a raising and lowering apparatus affixed to the frame and configured to raise and lower the platform from a raised position in which the container is not submerged in the fluid to a lowered position in which the container is partially or fully submerged in the fluid, and a dryer located downstream of the dip tank and configured to dry the container and the fragile fruit.

In another aspect a method of wet filling a container with fragile fruit is provided. The method comprises the steps of transporting the fragile fruit to a hopper; weighing the fragile fruit in the hopper; positioning a container above a dip tank containing a fluid; partially or fully submerging the container in a fluid; filling the submerged container with fragile fruit; raising the container out of the dip tank to capture the fragile fruit in a desired orientation; and drying the fragile fruit.

In still another aspect a "dry fill" apparatus is provided that comprises a dip tank affixed to a frame and configured to hold a fluid, a berry conveyor located near the dip tank for transporting the fragile fruit to a hopper operably connected to a load cell for measuring the weight of the fragile fruit in the hopper, means for transporting the fragile fruit from the hopper to the container to create a filled container, a raising and lowering apparatus affixed to the frame and configured to raise and lower the filled container from a raised position in which the filled container is not submerged in the fluid to a lowered position in which the filled container is partially or fully submerged in the fluid, and a dryer located downstream of the dip tank and configured to remove fluid from the container and the fragile fruit.

In another aspect a method of dry filling a container with fragile fruit is provided. The method comprises the steps of transporting the fragile fruit to a hopper; weighing the fragile fruit in the hopper; transferring the fragile fruit from the hopper to an empty container to create filled container; partially or fully submerging the filled container in fluid; lifting the container vertically upward to capture the fragile fruit in a desired orientation; and drying the fragile fruit.

DESCRIPTION OF EXAMPLES OF EMBODIMENTS

Figure 1:
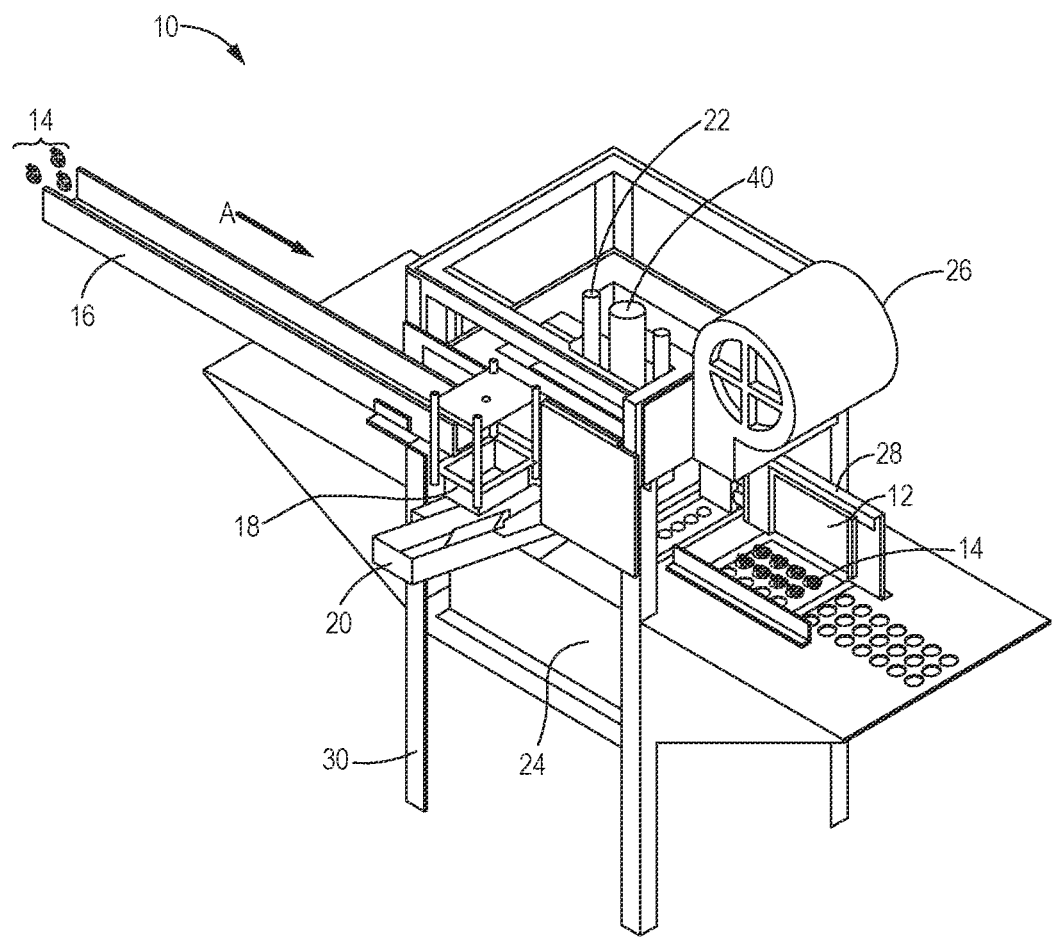
FIG. 1 is a perspective view of an apparatus for wet filling a container with articles such as fragile fruit.

While the invention described herein may be embodied in many forms, there is shown in the drawings and will herein be described in detail one or more embodiments with the understanding that this disclosure is to be considered an exemplification of the principles of the invention and is not intended to limit the disclosure to the illustrated embodiments. Aspects of the different embodiments can be combined with or substituted for one another.

This disclosure relates to an apparatus and method of filling a container or package with articles such as fragile fruit, an example of which is strawberries. For the purpose of this description the articles will be termed "fruit," "berries" or "strawberries," although it should be understood that the methods may apply to other types of articles.

The term "berries" as used herein should not be considered limiting and may include strawberries, fragile fruit or any articles.

The term "water" as used herein should not be considered limiting and may include untreated water, treated water, or any suitable fluid, preferably a fluid in which the fragile fruit is buoyant. The water may be sanitized, treated and/or contain additives to mitigate any damage to the fruit.

Apparatus for Wet Filling a Container

Turning to the drawings, FIGS. 1-4 are various views of an apparatus 10 for filling a container 12 with articles 14 such as fragile fruit. In the illustrated embodiment the apparatus 10 comprises a frame 30, a berry transport chute 16, a berry hopper 18, a feed chute 20, a raising and lowering apparatus 22, a dip tank 24, a dryer 26 and a lid closing station 28.

The frame 30 may be any suitable configuration and is designed to support or otherwise maintain the positioning of the various other components of the apparatus 10. The frame 30 may be affixed to a floor or to another apparatus such as a harvesting machine.

The berry transport chute 16 may be mounted to the frame 30. The chute 16 may comprise a conveyor belt. Alternatively, or in addition to a conveyor belt, the chute 16 may be configured to accommodate a stream of water and thus may communicate with a water source. The chute 16 may be mounted to the frame 30 at a downward angle. The lower end of the berry transport chute 16 may communicate with the berry hopper 18 which receives the berries 14.

Figure 2:
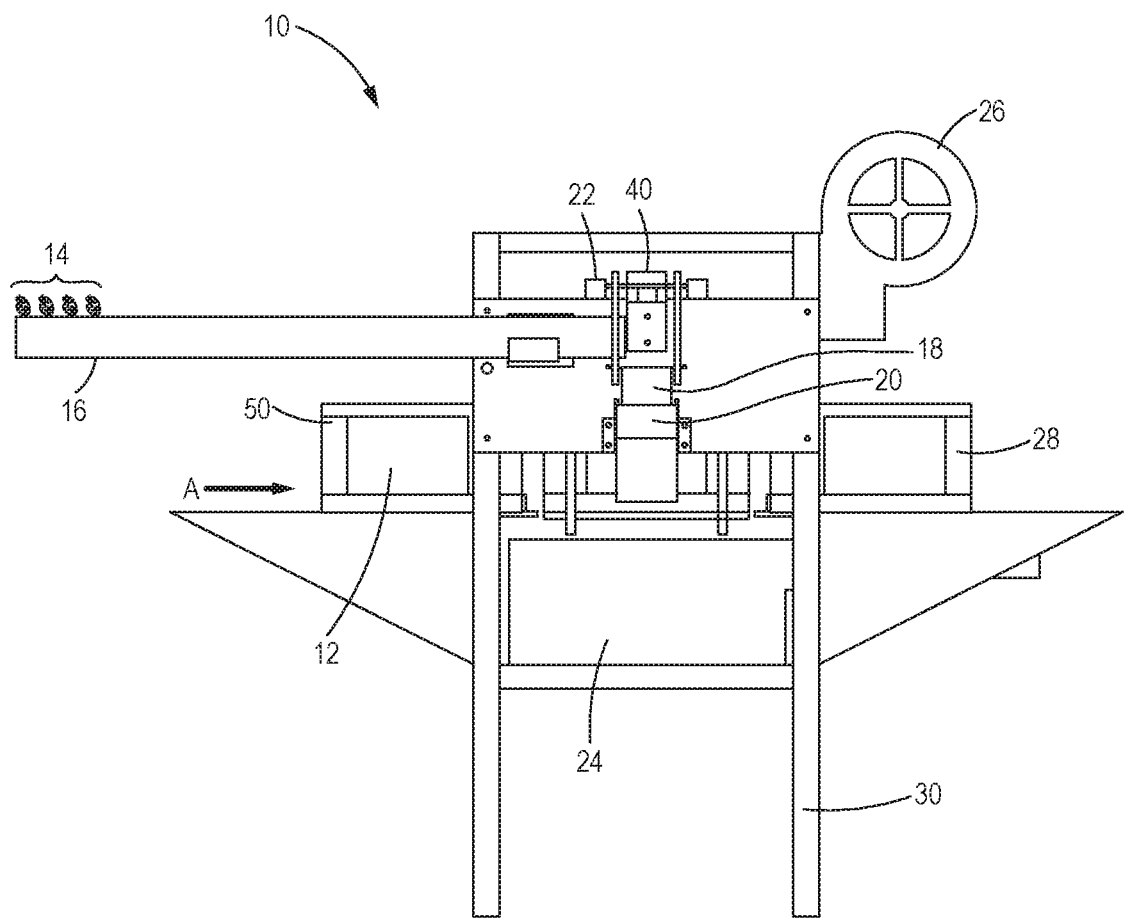
FIG. 2 is a side view of the apparatus of FIG. 1.
Figure 3:
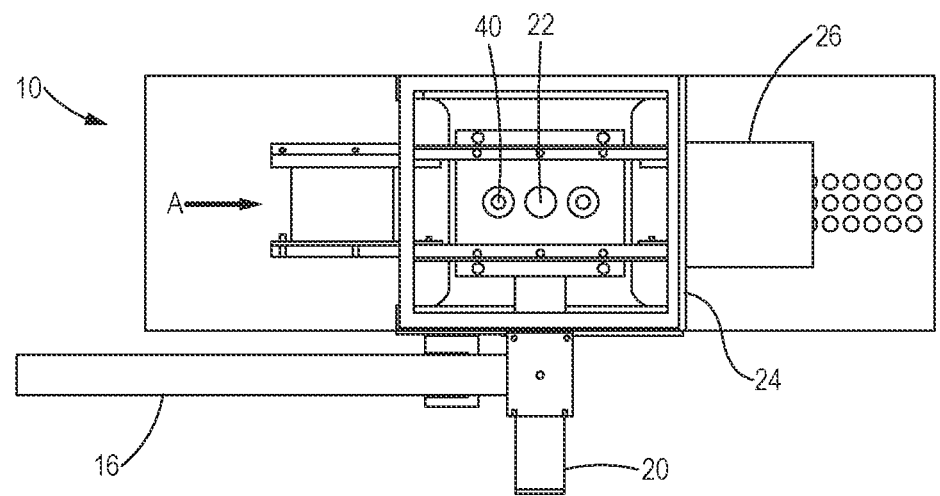
FIG. 3 is a top view of the apparatus of FIG. 1.

FIG. 2 is a side view of the wet fill apparatus 10. Viewed from this side, the containers 12 move from left to right in the direction of arrow (A) using a container guide 50. The guide 50 may be any suitable mechanism such as a conveyor. The berry hopper 18 may be mounted to the frame 30 upstream of the dip tank 24. The berry hopper 18 may be positioned so that berries 14 coming off the berry chute 16 drop gently into the hopper 18 and are weighed by a load cell. Sensors may be used to track the number and size of berries 14 in the hopper 18. For example, when the hopper 18 is about 90% full by target weight, a berry selection system (not shown) may be used to add only small berries 14 to the hopper 18 until the desired weight is achieved.

The feed chute 20 is configured to receive berries 14 from the hopper 18 and transport them into the container 12, preferably while the container 12 is fully or partially submerged. The feed chute 20 is mounted to the frame 30 and may rotate about an axis (B) (shown in FIG. 4) so that the feed chute 20 remains in communication with (always feeds into) the container 12. This rotation will cause the feed chute 20 to be oriented at a steeper angle than that shown in the figure. The feed chute 20 may accommodate water to help transport the berries 14.

Figure 5:
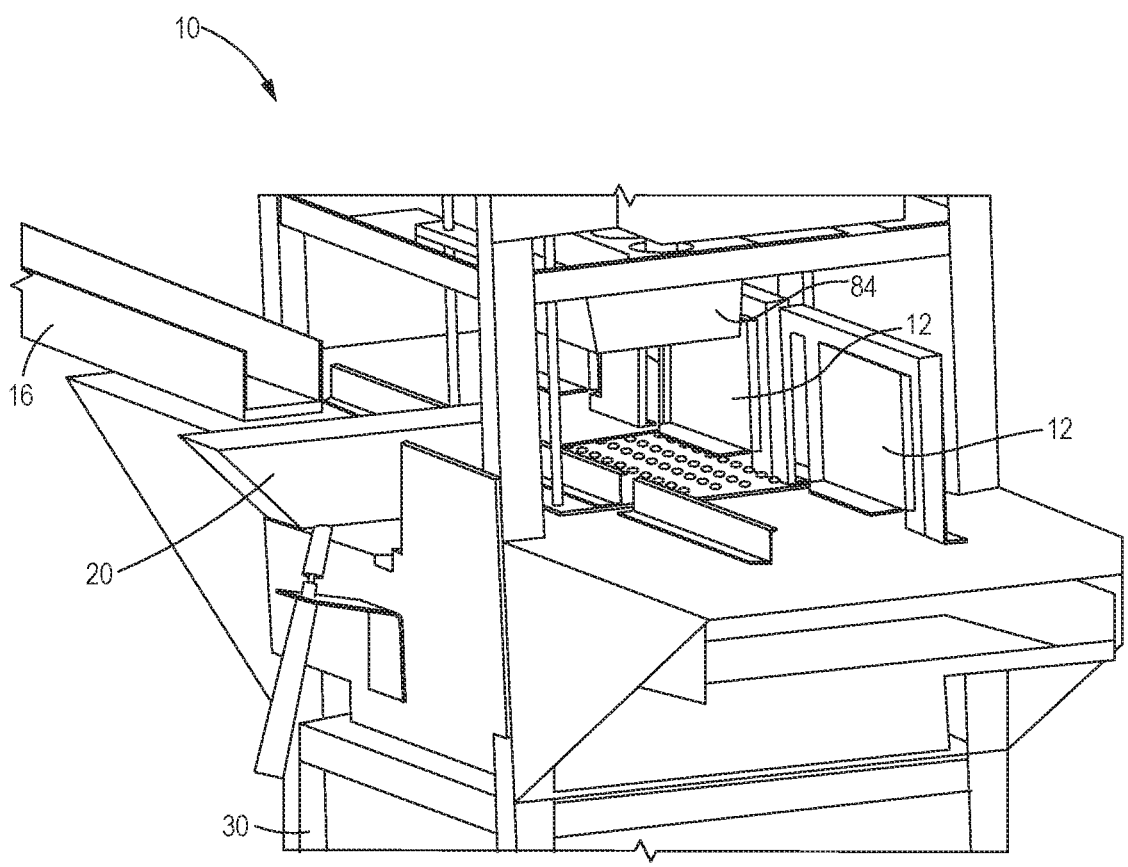
FIG. 5 is a perspective view of an alternative apparatus for wet filling a container with articles such as fragile fruit.

In a possible refinement shown in FIG. 5, the apparatus 10 lacks a berry hopper 18 and the berries 14 are transferred directly from the berry transport chute 16 to the feed chute 20. In this alternative, the berries 14 may be weighed while in the feed chute 20 and before being dumped into a submerged container 12. The feed chute 20 may be partially filled with water and the weight of the water zeroed out to provide an accurate weight of the berries 14. When the desired weight is reached, the apparatus 10 may automatically prevent additional berries 14 from entering the feed chute 20. After a batch of strawberries 14 is dumped from the feed chute 20 into the container 12, the feed chute 20 may be automatically re-filled with water before receiving the next batch of strawberries 14 from the berry transport chute 16.

The lowering and raising apparatus 22 is mounted to the frame 30 and functions to lower and raise the container 12 into and out of the dip tank 24. The raising and lower apparatus 22 includes a platform 36 on which the container 12 rests, and a lid retaining guide 38 for holding the container lid 34 in the open position. The raising and lower apparatus 22 may also include one or more pneumatic cylinders 40 or other lowering and raising means. The lowering and raising apparatus 22 may be operably connected to a switch (not shown) that closes the doors of the hopper 18, preventing berries from being fed into the feed chute 20. The lowering and raising apparatus 22 may be configured to slightly tilt the container 12 back and forth as it is lifted out of the water to enhance water drainage.

The dip tank 24 is mounted to the frame 30 and holds water or other fluid. The fluid causes the berries 14 to float, which helps distribute them evenly in the container 12. The fluid also provides a cushion to protect the berries 14 as they enter the container 12 and redistribute within the container 12.

Optionally, a vibrating mechanism (not shown) may be operably mounted to the dip tank 24 so that the dip tank 24 and/or the berry filled container 12 can be vibrated or oscillated to enhance distribution of the berries within the container 12 and help drain water from the berry filled container 12.

Optionally, a constraining structure 84 ("constrainer") can be located in or above the dip tank 24 to initially constrain the floating berries 14 before or while they are fed into the fully or partially submerged container 12. This constrainer 84 may be approximately the same size—in terms of width and length—as the footprint of the container 12.

The dryer 26 is mounted to the frame 30 downstream of the dip tank 24 to help dry the berries 14. The dryer 26 may be configured to accommodate a low pressure, high volume air stream. The drying air may be chilled, warm or ambient.

Preferably the lid closing station 50 is mounted to the frame 30 downstream of the dryer 26, and is configured to position the container lid 34 onto the container tray 32 to close the container 12 prior to shipping.

Method of Wet Filling a Container

Figure 6:
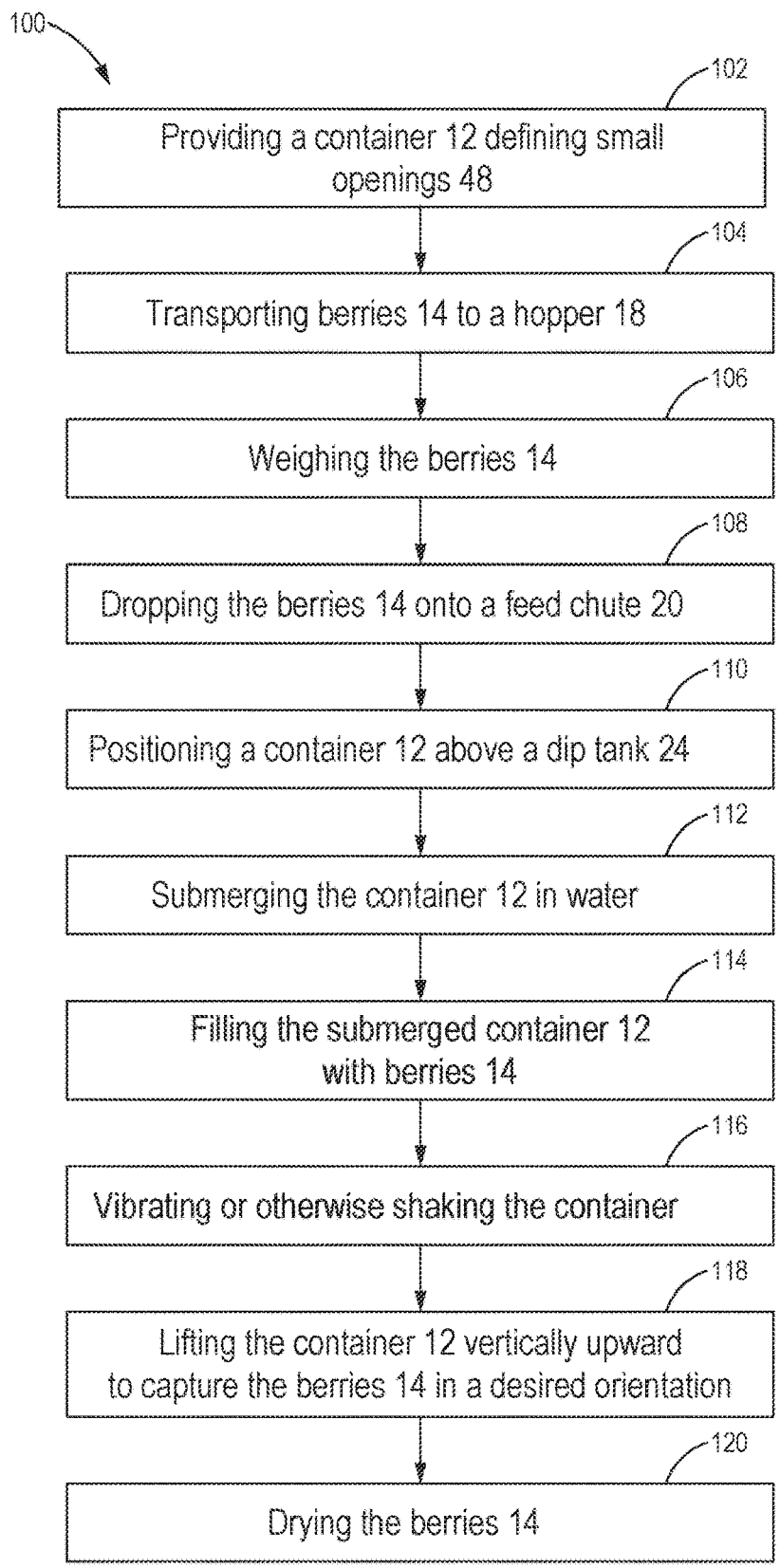
FIG. 6 is a schematic illustration of a method of wet filling a container with articles such as fragile fruit using the apparatus of FIG. 1.

FIG. 6 is a schematic illustration of a method 100 of "wet filling" a container 12 with articles such as fragile fruit 14 using the apparatus 10 of FIGS. 1-4. The method may generally be described as comprising one or more of the following steps:

Step 102: Providing a container 12 defining small openings 48.

Step 104: Transporting berries to a berry hopper 18.

Step 106: Weighing the berries 14 using a load cell or other means.

Step 108: Dropping or otherwise transferring the berries 14 into a feed chute 20.

Step 110: Positioning a container 12 above a dip tank 24.

Step 112: Submerging the container 12 in fluid.

Step 114: Filling the submerged container 12 with berries 14.

Step 116: Vibrating or otherwise shaking the container 12.

Step 118: Lifting or raising the container 12 vertically upward to capture the berries 14 in a desired orientation.

Step 120: Drying the berries 14, and closing the container 12.

More particularly, the method 100 may comprise the following steps:

1. Providing a Container 12 Defining Small Openings 48.

Figure 10:
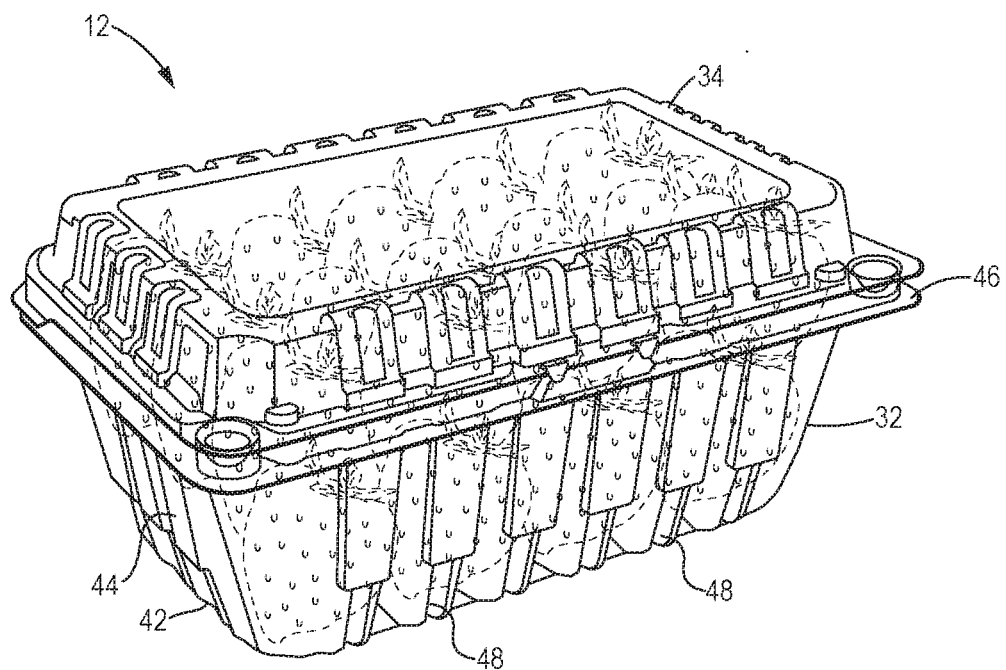
FIG. 10 is a perspective view of a container.

The container 12 may be a conventional container known in the art, such as a transparent plastic clamshell container. As shown in FIG. 10, an exemplary container 12 is provided comprising a tray 32 and a lid 34. Preferably the lid 34 is attached to the tray 32 via a hinge. The tray 32 may comprise a bottom 42 and sides 44 extending upwardly from the bottom 42 and terminating at a rim 46. Preferably the container 12 defines air vent holes or other openings 48 through which water may enter into and drain out of the container 12. It should be understood that the container 12 of FIG. 10 is just an example and that other containers can be used with the apparatus and method described herein. For example, in one alternative the container 12 may comprise a tray 32 and a separate lid or overcap that forms a snap fit with the tray 12. In yet another alternative, the container comprises a tray having a top rim that defines an opening that can be closed with a film or membrane.

2. Transporting the Berries 14 to the Hopper 18.

The berries or other fragile fruit 14 are harvested, either in the field or in a controlled indoor environment. The berries 14 then are transported to the filling apparatus 10 where they are placed in a berry transport chute 16. The berries 14 are then transported, via water transport, conveyor belt, air or any suitable means, to the berry hopper 18.

For example, the fruit 14 may be transported through the chute 16 and into the hopper 18 using flowing water or another liquid medium. The water can flow into the hopper 18 in a continuous stream while the berries 14 are introduced into the stream of water in the chute 16. Alternatively, the water can also flow through the chute 16 and into the hopper 18 in a "pulsing" or "flushing" manner, for example, by using water jets located along the chute 16. In yet another alternative, slowly rolling cylinders (not shown) may be used, with or without water, to transport the berries 14. The rolling cylinders may also help separate the berries 14.

The berries 14 may be placed into the chute 16 in such a manner that several groups of berries enter the hopper 18 at different times or so that the entire desired amount of berries enters the hopper 18 all at once. Alternatively, the berries 14 can be transferred individually into the hopper 18.

3. Optional Sorting.

Optionally, the berries 14 can be sorted according to size using various soring means known in the art, such as pairs of belts or rods defining a gradually widening gap. The sorting may be done before the berries 14 are placed in the chute 16 or at any suitable time.

4. Weighing.

After entering the hopper 18 the berries 14 are weighed, preferably using a load cell or a weigh scale positioned under the hopper 18. The weighing process may be continuous until a target weight is reached. Once a target weight is achieved, the apparatus may stop any more berries 14 from entering the hopper 18.

The bottom of the hopper 18 may comprise doors (not readily shown in the figure) that open so that the target weight of berries 14 is dropped onto the water filled feed chute 20. Alternatively, the berries 14 may be transferred from the berry hopper 18 to the feed chute 20 by or by tilting or overturning the berry hopper 18.

The berries 14 may be transferred into the feed chute 20 in either pre-weighed groups or individually. If the strawberries 14 are introduced into the hopper 18 individually, each berry 14 can then be weighed and/or measured individually, then dropped into the water filled feed chute 20 and, ultimately, into the submerged container 12. During this "individual" feeding process, a cumulative weight of the strawberries 14 can be calculated to achieve a predetermined total weight of the strawberries 14 in each container 12. When that total weight is achieved, the feeding process to the feed chute 20 is stopped or terminated. In this way, damage to the berries 14 due to excess weight in the container 12 can be eliminated.

In one possible refinement intended to handle the berries 14 even more gently, instead of transferring the berries 14 into a dry hopper 18, the hopper 18 is first partially filled with water. In this refinement, the apparatus 10 further comprises a refillable water reservoir (not shown), preferably located above the hopper 18 and configured so that the water in the reservoir can be poured or otherwise transferred to the hopper 18. As noted above, the hopper 18 is operably connected to a load cell that can measure the weight of the hopper and its contents. After the water from the reservoir is poured or otherwise transferred to the hopper 18, the hopper 18 is weighed to determine the weight of the water-filled hopper 18. The berries 14 then are added to the hopper 18 as the hopper 18, together with its contents, is weighed in real time to obtain a real time weight. When the hopper 18 contains a predetermined weight of berries 14 (calculated by subtracting the weight of the water-filled hopper 18 from the real time weight), the transfer of berries 14 into the hopper 18 is stopped. Next, the hopper 18 opens so the berries 14 are carried down the chute 20 and into a container 12.

5. Positioning a Container 12 Above the Dip Tank 24.

Multiple containers 12 may be stacked or otherwise stored so that they can be individually fed to the apparatus 10. This storing and feeding of containers 12 may involve conventional technology such as a de-nester.

After a container 12 is fed to the apparatus 10, the container 12 is positioned above the water in the dip tank 24 using any suitable means. For example, a single container 12 can be guided into position above the dip tank 24 manually or by a suitable guiding apparatus (not shown). In FIGS. 1 and 2, arrow (A) indicates a preferred directed that each container 12 takes as it travels through the apparatus 10.

Figure 4:
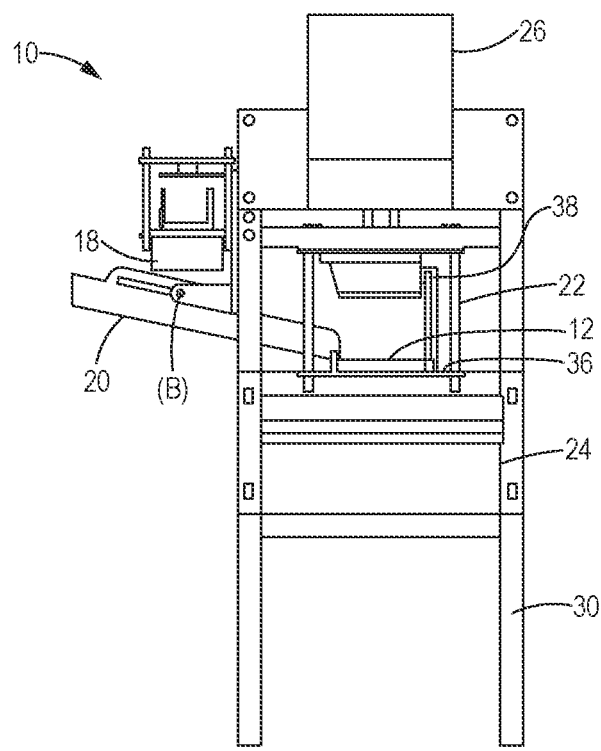
FIG. 4 is an end view of the apparatus of FIG. 1.

As perhaps best shown in FIG. 4, upon entering the area above the dip tank 24, the container 12 rests on a platform 36 and is held in a first, raised, position above the dip tank 24 by a lowering and raising apparatus 22. While in this raised position and during the lowering and raising of the container 12 into and out of the water, the container tray 32 may rest on the platform 36 and the container lid 34 may be held in a vertical (open) position by a lid retaining guide 38.

Optionally, while the container 12 is positioned above the dip tank 24, the lowering and raising apparatus 22, the lid retaining guide 38 or even the container 12 itself may activate a switch (not shown) that holds the doors of the berry hopper 18 closed, thereby preventing berries 14 from being fed into the feed chute 20 and then into the empty container 12.

6. Submerging the Container 12.

The empty container 12 is then lowered into the water in the dip tank 24. The empty container 12 may be lowered into the water using a set of pneumatic cylinders 40 or other lowering and raising means 38. Upon being lowered, the container 12 and, more specifically, the container tray 32, may be partially or fully submerged in the water. For example, the container 12 can be lowered into the water so that the container tray 32 is submerged halfway, that is, the tray sidewalls 44 are submerged halfway, thereby covering some or all of the berries 14 as they are fed into the submerged container 12 in the filling step. Alternatively, the tray sidewalls 44, and thus the entire tray 32, may be fully submerged under the water prior to filling.

As the container 12 is lowered into the dip tank 24, the feed chute 20 may rotate about an axis (B) so that the feed chute 20 remains in communication with (always feeds into) the container 12. This rotation will cause the feed chute 20 to be oriented at a steeper angle than that shown in the figure when berries are being fed into the container 12 during the filling step. If desired, some berries 14 can be fed into the container 12 prior to it being submerged.

7. "Wet" Filling the Container.

Next, the submerged container 12 is filled with berries 14. While the container 12 is submerged, the berries 14 are dropped or dumped from the berry hopper 18 into the feed chute 20 (which may contain water). During the filling step, and while the container 12 is partially or fully submerged, the berries 14 may evenly redistribute within the container 12. This even distribution is accomplished as the berries 14 float within the water, then re-settle into the container 12 when the container 12 is raised above the water. The water also provides a cushion to protect the berries as they redistribute within the container 12.

8. Vibrating.

The container 12 and/or the dip tank 20 can be vibrated, shook, oscillated or otherwise moved to settle or otherwise enhance distribution of the berries 14 in the container 12, either while or after it is submerged. The movement of the container 12 causes the berries 14 to temporarily float or be suspended in the water above the container 12 while being distributed evenly throughout the container 12.

For example, vibrating the container 12 can more evenly pack the berries 14 and/or reduce gaps or voids. If desired, vibrating the filled container 12 can ensure that the berries 14 are evenly distributed as a single layer or double layer. A single layer container would allow the consumer to easily view all the berries 14 prior to purchase. The filled container 12 can be re-submerged one or more times to further enhance distribution of the berries 14. The filled container 12 can be moved gently and slightly up and down in the water to enhance distribution of the berries 14.

9. Capturing.

Next, the filled container 12 is then raised out of the water (lifted vertically upward) using the pneumatic cylinders 40 or other lowering and raising means 38. Upon being lifted out of the water, the berries 14 are captured in the desired orientation. Again, if desired, this step can be done using a container 12 in which the berries 14 are generally distributed in a single layer.

10. Drying.

Upon being lifted out of the dip tank 24, the water inside the container 12 will begin to drain out through vent holes, slots or other openings 48 in the container 12. In addition to this natural drainage, the berries can be "dried" using other means, such as by low pressure, high volume air emanating from a dryer 26. The drying air may be chilled, warm or ambient.

11. Closing the Container 12.

Finally, the container 12 is closed to secure the berries 14 inside the container 12. At the lid closing station 28, the container lid 34 is positioned (rotated) onto the container tray 32 to close the container 12 prior to shipping. Preferably the lid 36 forms a snap fit with the tray 32.

Additional optional steps include the following:

12. Constraining.

Optionally, during the filling step, the berries 14 can be transferred from the feed chute 20 to a constrained area above the partially or completely submerged container 12. The berries 14 can be introduced into the constrained area above the submerged container 12 via water transport, conveyor or air, or dropped vertically into the constrained area filled with water. The berries 14 will generally float horizontally (on their side) in the water above the container 12. Thus the berries' natural buoyancy allows them to separate and fill the constrained area. This constrained area may be approximately the same size as the footprint of the container 12.

For example, a constrainer 84 may initially be positioned above the empty container 12 as shown in FIG. 5 and operably connected to the raising and lowering apparatus 22. The constrainer 84 descends until it is on top of the empty container 12, then both are lowered into the water in the dip tank 24. Next, the berries 14 are transferred into the constrainer 84 through a hole or other opening in the top of the constrainer 84. The berries may float within the constrainer 84. Finally, the berries 14 are gently dropped or lowered into the container 12, either through an opening in the bottom of the constrainer 84 or by tilting or overturning the constrainer 84 so that the berries 14 float gently down into the container 12.

Apparatus for Dry Filling a Container

Figure 7:
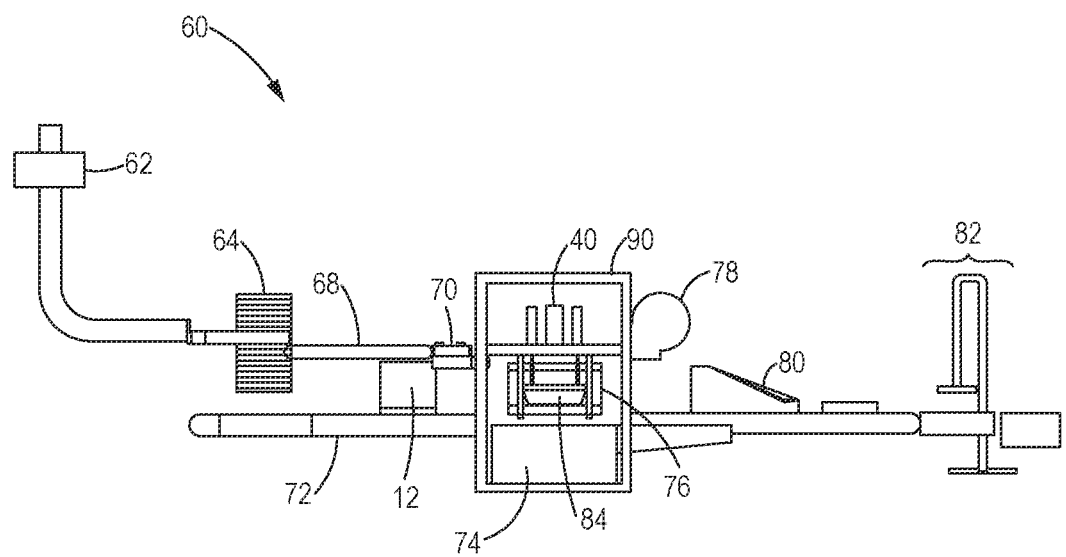
FIG. 7 is a side view of an apparatus for dry filling a container with articles such as fragile fruit.
Figure 8:
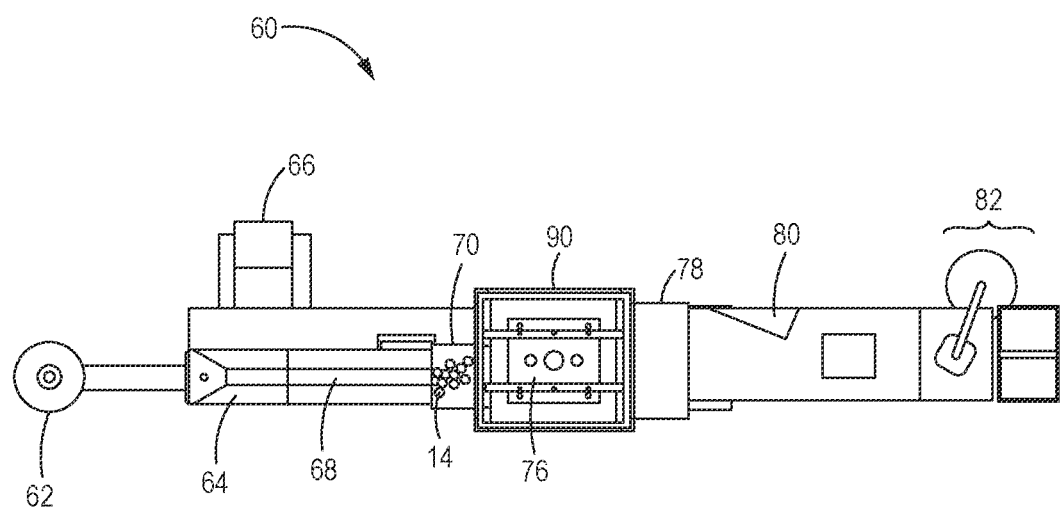
FIG. 8 is a top view of the apparatus of FIG. 7.

FIGS. 7 and 8 are diagrammatic views of an apparatus 60 for filling a container with articles such as fragile fruit before the container is submerged. The apparatus 60 may comprise a frame 90, an inspection and sorting station 62, a size diverter 64, a container de-nester 66, a berry conveyor 68, a berry hopper 70, a container conveyor 72, a dip tank 74, a raising and lowering apparatus 76, a dryer 78, a lid closing station 80, and a packaging station 82.

The frame 90 may be any suitable configuration and is designed to support or otherwise maintain the positioning of the various other components of the apparatus 60. The frame 90 may be affixed to a floor or to another apparatus such as a harvesting machine.

The inspection and sorting station 62 may be affixed to the frame 90 and is configured to enable the inspection and sorting of the berries 14.

The size diverter 64 may be affixed to the frame 90 and is configured to sort berries 14 according to size. The size diverter may be conventional in design and may comprise pairs of belts or rods defining a gradually widening gap.

The container de-nester 66 may hold multiple containers 12 in a stacked arrangement and is configured to select single containers 12 and place them on the container conveyor 72. The container de-nester 66 may be located above the container conveyor belt 72 or in any suitable orientation with respect to the conveyor belt 72. After each container 12 is placed onto the belt 72, the opened container 12 advances to a position preferably beneath the berry fill station 70. As in the wet fill apparatus 10, the conveyor 72, and all mechanisms described herein, may be controlled by a programmable logic controller (PLC).

The berry conveyor 68 should be located near the dip tank 74 and is used to transport the fragile fruit 14 to the hopper 70. Preferably the berry conveyor 68 is a cleated berry conveyor belt 68.

The berry hopper 70 may be mounted to the frame 90 upstream of the dip tank 74. The hopper 70 may be positioned so that berries 14 coming off the berry conveyor 68 drop gently into the hopper 70, are weighed by a load cell and then dropped into an open container 12. Sensors may be used to track the number and size of berries 14 in each container 12. For example, when a container 12 is about 90% full by weight, a berry selection system (not shown) may be used to add only small berries to the container 12 until the desired weight is achieved.

The dip tank 74 is mounted to the frame 90 and holds water or other fluid. The water causes the berries 14 to float which helps distribute them evenly in the container 12. The water also provides a cushion to protect the berries 14 as they enter the container 12 and redistribute within the container 12.

The lowering and raising apparatus 76 is mounted to the frame 90 and functions to lower and raise the container 12 into and out of the dip tank 74. The raising and lower apparatus 76 may include a platform 84 on which the container 12 rests, and a lid retaining guide (not shown) for holding the container lid 34 in the open position. The raising and lower apparatus 76 may also include one or more pneumatic cylinders 40 or other lowering and raising means.

Optionally, a vibrating mechanism (not shown) may be operably mounted to the dip tank 74 so that the dip tank 74 can be vibrated or oscillated to enhance distribution of the berries 14 within the container 12.

The dryer 78 is mounted to the frame 90 downstream of the dip tank 74 to help dry the berries 14. The dryer 78 may be configured to accommodate a low pressure, high volume air stream. The drying air may be chilled, warm or ambient.

The lid closing station 80 preferably is mounted to the frame 90 downstream of the dryer 78, and is configured to position the container lid 34 onto the container tray 32 to close the container 12 prior to shipping.

At the packing station 82 located downstream of the lid closing station 80, the filled containers 12 may be packed into a larger shipping container.

Method of Dry Filling a Container

Figure 9:
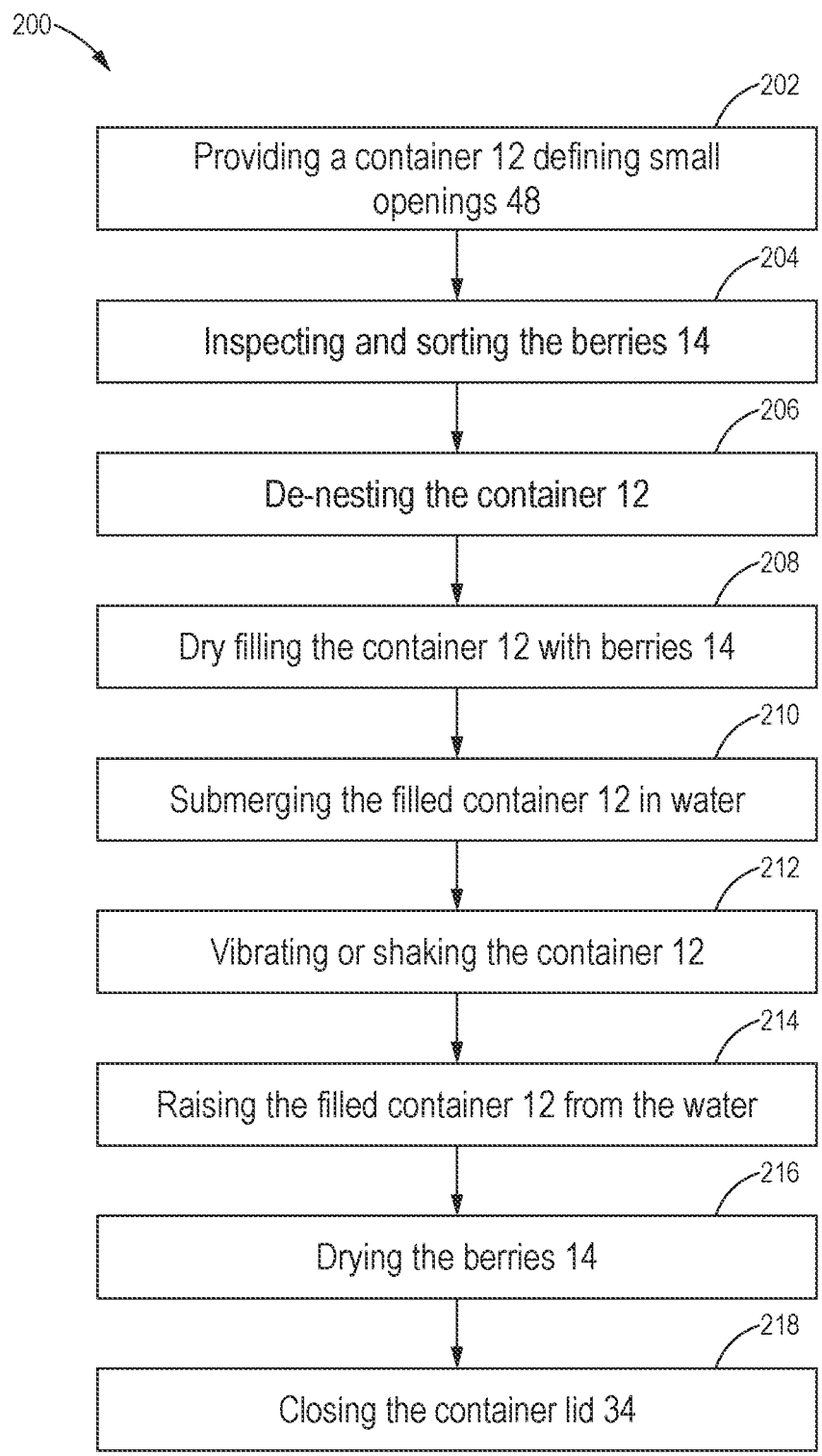
FIG. 9 is a schematic illustration of a method of dry filling a container with articles such as fragile fruit using the apparatus of FIG. 7.

FIG. 9 is a schematic illustration of a method 200 of filling a container 12 with articles such as fragile fruit 12 using the apparatus 60 of FIGS. 7 and 8. The method 200 may generally be described as comprising one or more of the following steps:

Step 202: Providing a container 12 defining small openings 48.
Step 204: Inspecting and sorting the berries 14.
Step 206: De-nesting a container 12.
Step 208: Dry filling the container 12 with berries 14.
Step 210: Submerging the filled container 12 in water.
Step 212: Vibrating or shaking the container 12.
Step 214: Raising the container 12 from the water.
Step 216: Drying the berries 14.
Step 218: Closing the container lid 34.

More particularly, the method 200 may comprise the following steps:

1. Providing a Container 12 Defining Small Openings 48.

As shown in FIG. 10, a container 12 is provided comprising a tray 32 and a lid 34. Preferably the lid 34 is attached to the tray 32 via a hinge. The tray 32 may comprise a bottom 42 and sides 44 extending upwardly from the bottom 42 and terminating at a rim 46. Preferably the container 12 defines openings 48 through which water may enter into and drain out of the container 12. Although a clamshell container is preferred, any suitable container may be provided, including a container comprising a tray closed with a film membrane.

2. Inspecting and Sorting.

After being harvested, the berries 14 can be inspected and sorted at an inspection and sorting station 62. During this step the berries 14 can be sorted (segregated) according to size using a size diverter 24 or other apparatus. Once sorted, the berries 14 are transported to the fill station 70 by, for example, a cleated berry conveyor belt 68.

3. Container De-Nesting.

Multiple containers 12 may be stored in a chute located above or in any suitable orientation with respect to a container conveyor belt 72. If the containers 12 are stacked, the containers 12 can be individually pulled from the stack by a de-nester 66 and placed on the conveyor 72. After each container 12 is placed onto the conveyor 72, the opened container 12 advances to a position preferably beneath the fill station 70.

4. Dry Filling.

The fragile fruit 14 is transported to the hopper 70 by the conveyor 68 or other means.

5. Weighing.

The fragile fruit 14 in the hopper 70 is weighed by a load cell or other means. When a target weight is achieved, the fragile fruit 14 is dropped or otherwise transferred to an empty container 12, preferably one that is located under the hopper 70. Alternatively, the fragile fruit 14 may be transported into the container 12 and then the filled container 12 is weighed.

6. Submerging.

The filled container then proceeds in the direction of arrow (A) in FIG. 7 to a dip tank station. At the dip tank station 74 the filled container 12 is partially or completely submerged in water or other liquid medium. While the filled container 12 is partially or fully submerged, the berries 14 can be redistributed and/or reoriented. This is accomplished as the berries 14 float within or on the water. The water also provides a cushion to protect the berries as they redistribute within the container 12.

More particularly, the container 12 filled with berries 14 is temporarily suspended above the water in the dip tank 74 as shown in FIG. 6, then lowered or pushed into the water using a set of pneumatic cylinders or other lowering and raising means 76. The container 12 may be partially submerged or fully submerged in the water. For example, the container 12 can be lowered into the water so that the container 12 is submerged halfway as determined by the sidewalls of the container 12.

7. Vibrating.

The container 12 and/or the dip tank 74 can be vibrated, shook, oscillated or otherwise moved to settle or otherwise enhance distribution of the berries 14 in the container 12, either while or after it is submerged. The movement of the container 12 causes the berries 14 to temporarily float or be suspended in the water above the container while being distributed evenly throughout the container 12.

For example, vibrating the container 12 can more evenly pack the berries 14 and/or reduce gaps or voids. If desired, vibrating the filled container 12 can ensure that the berries 14 are evenly distributed as a single layer or double layer. A single layer container would allow the consumer to easily view all the berries 14 prior to purchase.

8. Capturing.

Next, the filled container 12 is then raised out of the water (lifted vertically upward) using the pneumatic cylinders 40 or other lowering and raising means 76. Upon being lifted out of the water, the berries 14 are captured in the desired orientation.

9. Drying.

Upon being lifted out of the dip tank 74, the water inside the container 12 will begin to drain out through vent holes, slots or other openings 48 in the container 12. In addition to this natural drainage, the berries can be "dried" using other means, such as by low pressure, high volume air emanating from a dryer 78. The drying air which may be chilled, warm or ambient.

10. Closing the Container.

Finally, the container 12 is closed to secure the berries 14 inside the container 12. At the lid closing station 80, the container lid 34 is positioned (rotated) onto the container tray 32 to close the container 12 prior to shipping. Preferably the lid 36 forms a snap fit with the tray 32. Alternatively, if a container comprising a tray and a top membrane is used, the tray may be closed by heat sealing the membrane onto the tray rim.

11. Packing.

At the packaging station 82 the filled containers 12 may be packed into a larger shipping container.

INDUSTRIAL APPLICATIONS

The apparatus described herein may be used to package strawberries, other fragile fruit or any suitable articles. The apparatus may be used in the field or in a separate location, such as a packaging shed.

For example, in one application the container filling apparatus is used in a strawberry field and may accompany an automatic (robotic) strawberry harvester. The berries may be picked by the harvester, placed into water filled troughs, inspected, then fed into the container filling apparatus.

In another application the container filling apparatus may be located in a stationary shed, preferably near the strawberry field, and the harvested berries brought to the shed for packaging. The harvested berries may be placed into temporary plastic lugs or other containers, then transported to the shed where the berries are dumped into a water filled trough or other structure that holds the strawberries prior to their being fed to the container filling apparatus.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

What is claimed is:

1. A method comprising:
   transporting fragile fruit into a hopper;
   transferring the fragile fruit from the hopper into a container that is at least partially submerged in a fluid;
   vibrating the container while the container is at least partially submerged in the fluid and at least part of the fragile fruit is floating in the fluid; and
   raising the container out of the fluid while the fragile fruit are within the container.

2. The method of claim 1 further comprising:
   weighing the fragile fruit in the hopper while the fragile fruit are transported into the hopper.

3. The method of claim 2 wherein a load cell is used to weigh the fragile fruit in the hopper.

4. The method of claim 1, wherein vibrating the container while the container is at least partially submerged in the fluid further comprises:
   vibrating the container while the container is fully submerged in the fluid.

5. The method of claim 1, wherein the fragile fruit are strawberries.

6. The method of claim 1 further comprising:
   drying the fragile fruit within the container after the container is raised out of the fluid.

7. The method of claim 1 further comprising:
   closing a lid on the container to retain the fragile fruit within the container.

8. The method of claim 1 wherein the hopper is at least partially filled with the fluid while the fragile fruit are transported into the hopper.

9. The method of claim 1, wherein transporting the fragile fruit into the hopper further comprising:
   selectively adding at least a portion of the fragile fruit to the hopper.

10. The method of claim 1, wherein the container is fully submerged before the fragile fruit are transferred from the hopper into the container.

11. A system comprising:
    a hopper configured to receive fragile fruit and transfer the fragile fruit from the hopper into a container; and
    a container lift configured to (i) lower a container to be at least partially submerged in a fluid to receive the fragile fruit in the container and (ii) raise the container out of the fluid while the fragile fruit are in the container,
    wherein the system is configured to vibrate the container while the container is at least partially submerged in the fluid and at least part of the fragile fruit is floating in the fluid.

12. The system of claim 11, wherein:
    the hopper is configured to receive the fragile fruit while the fragile fruit are weighed in the hopper.

13. The system of claim 12 further comprising:
    a load cell configured to weigh the fragile fruit in the hopper.

14. The system of claim 11, wherein:
    the system is further configured to vibrate the container while the container is fully submerged in the fluid.

15. The system of claim 11, wherein the fragile fruit are strawberries.

16. The system of claim 11 further comprising:
    a dryer configured to dry the fragile fruit within the container after the container is raised out of the fluid.

17. The system of claim 11, wherein:
    the system is configured to close a lid on the container to retain the fragile fruit within the container.

18. The system of claim 11 wherein the hopper is configured to be at least partially filled with the fluid while the fragile fruit are received into the hopper.

19. The system of claim 11, wherein:
    the system is configured to selectively add at least a portion of the fragile fruit to the hopper.

20. The system of claim 11, wherein the container lift is configured to fully submerge the container before the fragile fruit are transferred from the hopper into the container.

* * * * *